United States Patent
Donar et al.

(10) Patent No.: US 8,706,381 B2
(45) Date of Patent: Apr. 22, 2014

(54) SYSTEM AND METHOD FOR DETECTION FAILURES OF MASS AIRFLOW SENSORS IN A PARALLEL INTAKE ENGINE

(75) Inventors: Paul D. Donar, Fenton, MI (US); Layne K. Wiggins, Plymouth, MI (US); Jill A. Slimmer-Velez, Brighton, MI (US)

(73) Assignee: GM Global Technology Operations LLC

( * ) Notice: Subject to any disclaimer, the term of this patent is extended or adjusted under 35 U.S.C. 154(b) by 503 days.

(21) Appl. No.: 13/149,148

(22) Filed: May 31, 2011

(65) Prior Publication Data

US 2012/0310508 A1 Dec. 6, 2012

(51) Int. Cl.
*G01M 15/00* (2006.01)
(52) U.S. Cl.
USPC .................... 701/103; 701/107; 73/114.32
(58) Field of Classification Search
USPC .................... 701/103, 107, 114; 73/114.32
See application file for complete search history.

(56) References Cited

U.S. PATENT DOCUMENTS

| | | | |
|---|---|---|---|
| 6,701,282 B2 | 3/2004 | Ting et al. | |
| 6,763,708 B2 * | 7/2004 | Ting et al. | 73/114.74 |
| 6,990,856 B2 * | 1/2006 | Dempsey et al. | 73/114.33 |
| 7,069,773 B2 * | 7/2006 | Stempnik et al. | 73/114.32 |
| 7,266,442 B2 * | 9/2007 | Ting et al. | 701/114 |
| 8,224,592 B2 * | 7/2012 | De Cristofaro et al. | 702/45 |
| 8,255,143 B2 * | 8/2012 | Shibata et al. | 701/111 |

* cited by examiner

*Primary Examiner* — Thomas Moulis

(57) ABSTRACT

A system for a parallel intake engine includes first, second, third, and fourth modules. The first module estimates a total mass air flow (MAF) into the engine based on a cross-sectional area of a throttle and a pressure ratio across the throttle. The second module estimates first and second MAFs through first and second induction paths, respectively, based on the estimated total MAF and a factor. The third module calculates first and second differences between the estimated first and second MAFs and first and second MAFs measured by first and second MAF sensors, respectively. The fourth module detects failures of the first and second MAF sensors based on the first and second differences and first and second thresholds, respectively.

20 Claims, 3 Drawing Sheets

SYSTEM AND METHOD FOR DETECTION FAILURES OF MASS AIRFLOW SENSORS IN A PARALLEL INTAKE ENGINE

FIELD

The present disclosure relates to internal combustion engines and more particularly to a system and method for detecting failures of mass air flow (MAF) sensors in a parallel intake engine.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines draw air into an intake manifold through an induction system that may be regulated by a throttle. The induction system may include one or more intake ducts. For example, a parallel intake configuration may include two intake ducts that converge at a single duct that is connected to the intake manifold and regulated by the throttle. In addition, one or more turbochargers may pressurize the air drawn into the intake manifold. Twin-turbocharged engines may have varying configurations such as parallel, sequential, or staged.

The pressurized air in the intake manifold is distributed to a plurality of cylinders and combined with fuel to create an air/fuel (A/F) mixture. The A/F mixture is compressed and combusted within the cylinders to drive pistons that rotatably turn a crankshaft and generate drive torque. Exhaust gas resulting from combustion is expelled from the cylinders into an exhaust manifold. The pressure and/or flow of the exhaust gas may power the one or more turbochargers. The exhaust gas may also be treated by an exhaust treatment system before being released into the atmosphere.

SUMMARY

A system for a parallel intake engine includes first, second, third, and fourth modules. The first module estimates a total mass air flow (MAF) into the engine based on a cross-sectional area of a throttle and a pressure ratio across the throttle. The second module estimates first and second MAFs through first and second induction paths, respectively, based on the estimated total MAF and a factor. The third module calculates first and second differences between the estimated first and second MAFs and first and second MAFs measured by first and second MAF sensors, respectively. The fourth module detects failures of the first and second MAF sensors based on the first and second differences and first and second thresholds, respectively.

A method for a parallel intake engine includes estimating a total mass air flow (MAF) into the engine based on a cross-sectional area of a throttle and a pressure ratio across the throttle, estimating first and second MAFs through first and second induction paths, respectively, based on the estimated total MAF and a factor, calculating first and second differences between the estimated first and second MAFs and first and second MAFs measured by first and second MAF sensors, respectively, and detecting failures of the first and second MAF sensors based on the first and second differences and first and second thresholds, respectively.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
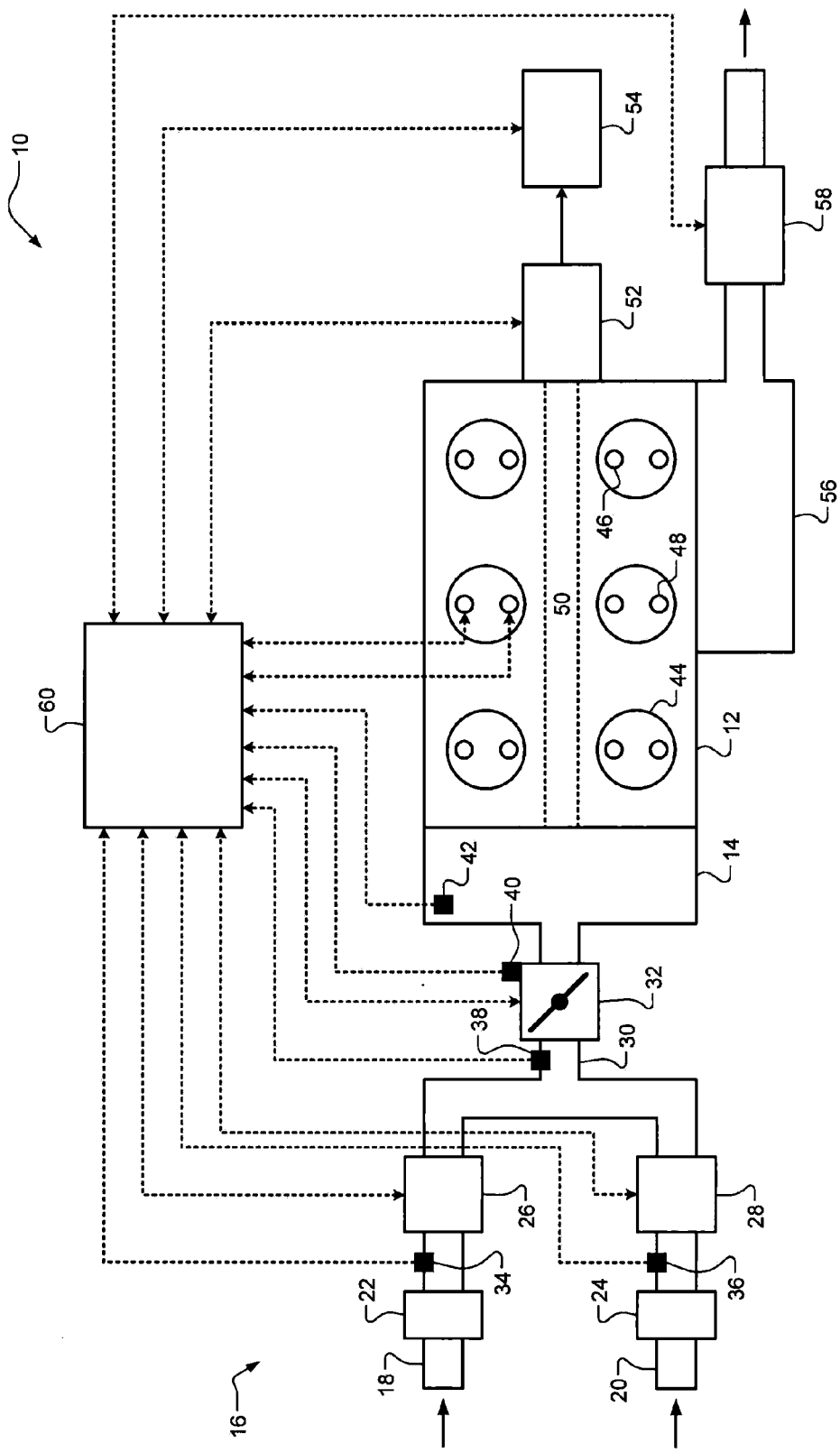
FIG. 1 is a functional block diagram of an example parallel intake engine system according to one implementation of the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Internal combustion engines may include one or more intake ducts. In addition, internal combustion engines may include one or more turbochargers that pressurize air drawn into an intake manifold. For example, an engine having two parallel turbochargers (i.e., a parallel twin-turbocharged engine) has separate induction paths for each turbocharger. Parallel intake engines may include a mass air flow (MAF) sensor for each intake duct. For example, parallel twin-turbocharged engines may include a MAF sensor upstream from each turbocharger. The MAF sensors may measure MAF through each intake duct which may be used by an engine control measured MAFs to obtain a total MAF for controlling the engine.

Conventional diagnostic systems diagnose a MAF sensor by estimating the MAF based on other operating parameters and comparing the estimated MAF to the measured MAF from the MAF sensor. In a parallel intake engine, however, estimating the MAF yields an estimate of the total MAF into the engine as opposed to estimates of the MAF through each of the intake ducts. Therefore, conventional diagnostic systems cannot determine which MAF sensor has failed when a failure is detected. Incorrect and/or inaccurate MAF sensor failure detection may increase costs and/or decrease performance.

Accordingly, a system and a method are presented for detecting failures of MAF sensors in a parallel intake engine. The system and method may first estimate a total MAF into the engine based on a pressure ratio across a throttle and a cross-sectional area of the throttle. The system and method may then determine a factor for splitting the estimated total MAF into separate components. The factor may be predetermined based on flow rates through the intake ducts, respectively. The system and method may determine the estimated MAFs through the intake ducts based on the estimated total MAF and the factor. The system and method may then calculate MAF residuals based on differences between measurements from the MAF sensors and the corresponding estimated MAFs.

The system and method may then detect failures of the MAF sensor(s) based on the MAF residuals and one or more thresholds. When the MAF residual for a MAF sensor is greater than a corresponding threshold, the system and method may discard measurements from the failed MAF sensor and estimate MAF based on other operating parameters. For example, the system and method may estimate the MAF for the failed MAF sensor based on operating parameters such as, but not limited to, turbocharger turbine speed, throttle position, exhaust gas oxygen concentration, etc. In addition, the system and method generate a failure signal to notify a driver and/or set a maintenance flag.

In addition, the system and method may detect failures of the MAF sensor(s) from a system-level view as opposed to a sensor-level view, as described in commonly assigned U.S. Pat. No. 6,701,282, which is herein incorporated by reference in its entirety. More specifically, due to interdependency of various system sensors, system-level detection of the MAF sensor(s) may prevent other diagnostic systems from erroneous failure detection when a given sensor fails. In other words, the system-level approach described by commonly owned U.S. Pat. No. 6,701,282 may be extended to parallel intake engines according to the present disclosure.

Referring now to FIG. 1, an example engine system 10 includes an engine 12. For example, the engine 12 may be a spark ignition (SI) engine, a diesel engine, a homogeneous charge compression ignition (HCCI) engine, or another suitable type of engine. In some implementations, the engine system 10 may be a hybrid system and therefore may further include additional components such as an electric motor and a battery system. The engine 12 draws air into an intake manifold 14 through an induction system 16.

The induction system 16 includes two parallel induction paths. More specifically, the induction system 16 includes intake ducts 18 and 20, air filters 22 and 24, and turbochargers 26 and 28. While a parallel twin-turbocharger configuration is shown, the system and method of the present disclosure may be implemented in other parallel intake engine systems. The air filters 22 and 24 remove particulates from the air. The turbochargers 26 and 28 pressurize the air flowing through the parallel induction paths. The parallel induction paths converge into another duct 30. Airflow through duct 30 and into the intake manifold 14 may be regulated by a throttle 32. For example, the throttle 32 may be electrically controlled via electronic throttle control (ETC).

MAF sensors 34 and 36 measure MAF through the parallel induction paths, respectively. More specifically, MAF sensors 34 and 36 measure MAF through intake ducts 18 and 20, respectively. A throttle inlet pressure (TIP) sensor 38 measures a pressure of air upstream from the throttle 32. A throttle position sensor (TPS) 40 measures a position of the throttle 32. A manifold absolute pressure (MAP) sensor 42 measures a pressure of air inside the intake manifold 14 (i.e., downstream from the throttle 32).

The air in the intake manifold 14 is distributed to a plurality of cylinders 44. While six cylinders are shown, the engine 12 may include other numbers of cylinders. The air is combined with fuel from a plurality of fuel injectors 46 to create an air/fuel (A/F) mixture. For example, the fuel injectors 46 may inject the fuel via intake ports (not shown) of the cylinders 44 or directly into the cylinders 44. The A/F mixture within the cylinders 44 is compressed by pistons (not shown) and combusted. Depending on the type of engine 12, spark plugs 48 may ignite the compressed A/F mixture. Alternatively, however, the A/F mixture may be compressed until auto-ignition occurs.

The combustion of the A/F mixture drives the pistons (not shown) which rotatably turn a crankshaft 50 and generate drive torque. The drive torque may be transferred to a driveline 54 of a vehicle via a transmission 52. For example, the transmission 52 may be coupled to the crankshaft 50 via a fluid coupling (not shown) such as a torque converter. Additional sensors (not shown) may measure a rotational speed of the crankshaft 50 ("engine speed") and/or a rotational speed of an output shaft of the transmission 52 ("vehicle speed").

Exhaust gas resulting from combustion is expelled from the cylinders 44 into an exhaust manifold 56. The pressure and/or flow of exhaust gas in the exhaust manifold 56 may be used to power the turbochargers 26 and 28. More specifically, additional ducts (not shown) may connect the exhaust manifold 56 to turbines (not shown) of the turbochargers 26 and 28. The exhaust gas in the exhaust manifold 56 may also be treated by an exhaust treatment system (ETS) 58 before being released into the atmosphere. For example only, the ETS 58 may include at least one of an oxidation catalyst (OC), nitrogen oxide (NOx) absorbers/adsorbers, a selective catalytic reduction (SCR) system, a particular matter (PM) filter, and/or a three-way catalytic converter.

A control module 60 controls operation of the engine system 10. The control module 60 may receive signals from turbochargers 26 and 28, the throttle 32, MAF sensors 34 and 36, the TIP sensor 38, the TPS 40, the MAP sensor 42, the fuel injectors 46, the spark plugs 48, the transmission 52, the driveline 54, and/or the ETS 58. The control module 60 may also receive signals from other suitable sensors such as signals indicating engine speed and vehicle speed. The control module 60 may control the turbochargers 26 and 28, the throttle 32, the fuel injectors 46, the spark plugs 48, the transmission 52, and/or the ETS 58. The control module 60 may also control other suitable components such as turbocharger boost controllers and wastegates. The control module 60 may also implement the system or method of the present disclosure.

Figure 2:
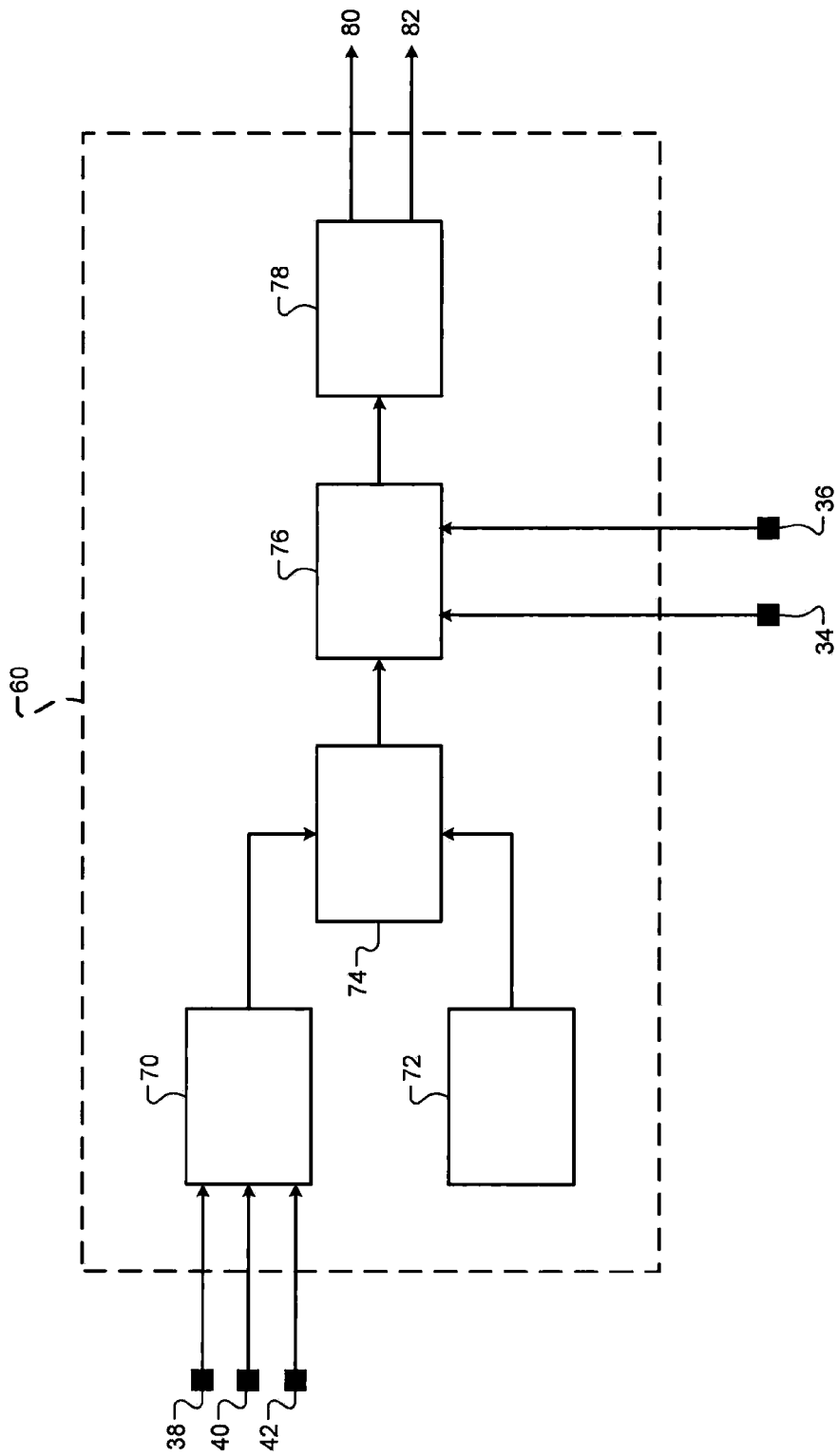
FIG. 2 is a functional block diagram of an example control module according to one implementation of the present disclosure.

Referring now to FIG. 2, an example of the control module 60 is shown. The control module 60 may include a total MAF estimation module 70, a factor generation module 72, a MAF split determination module 74, a residual calculation module 76, and a failure detection module 78.

The total MAF estimation module 70 receives signals from the TIP sensor 38, the TPS 40, and the MAP sensor 42 indicating measured TIP, measured throttle position, and measured MAP, respectively. The ratio between the measured MAP and the measured TIP (i.e., MAP/TIP) represents a pressure ratio across the throttle 32. The total MAF estimation module 70 estimates a total MAF ($MAF_{TOT}$) into the engine 12 based on the pressure ratio across the throttle 32 and a cross-sectional area of the throttle 32. The measured throttle position may be used to determine cross-sectional throttle area. Alternatively, for example, the cross-sectional area of the throttle 32 may be predetermined based on a diameter of the throttle body.

The factor generation module 72 generates a factor (R) for splitting the total MAF into separate components. The factor R is based on flow rates through the induction paths. More specifically, a first flow rate ($F_1$) may represent a flow rate through intake duct 18 and a second flow rate ($F_2$) may represent a flow rate through intake duct 20. The factor R represents a ratio of the first and second flow rates $F_1$ and $F_2$, respectively. More specifically, the factor R may equal $F_1/(F_1+F_2)$. Additionally, in some implementations the factor R may vary based on engine operating parameters.

The MAF split determination module 74 receives the estimated total MAF $MAF_{TOT}$ from the total MAF estimation module 70. The MAF split determination module 74 also receives the factor R from the factor generation module 72. The MAF split determination module 74 determines a first estimated MAF ($MAF1_{EST}$) and a second estimated MAF ($MAF2_{EST}$) based on the estimated total MAF $MAF_{TOT}$ and the factor R. The first estimated MAF $MAF1_{EST}$ represents an estimated MAF through intake duct 18 and the second estimated MAF $MAF2_{EST}$ represents an estimated MAF through intake duct 20. For example, the first and second estimated MAFs $MAF1_{EST}$ and $MAF2_{EST}$ may be determined as follows:

$$MAF1_{EST}=MAF_{TOT} \times R; \text{ and}$$

$$MAF2_{EST}=MAF_{TOT} \times (1-R).$$

The residual calculation module 76 receives the first and second estimated MAFs $MAF1_{EST}$ and $MAF2_{EST}$. The residual calculation module 76 also receives signals from the first and second MAF sensors 34 and 36 indicating measured MAFs ($MAF1_{ACT}$ and $MAF2_{ACT}$) through intake ducts 18 and 20, respectively. The residual calculation module 76 calculates first and second MAF residuals ($MAF1_{RES}$ and $MAF2_{RES}$) based on the first and second estimated MAFs $MAF1_{EST}$ and $MAF2_{EST}$ and the first and second measured MAFs $MAF1_{ACT}$ and $MAF2_{ACT}$, respectively. For example, the residual calculation module 76 may calculate the first and second MAF residuals $MAF1_{RES}$ and $MAF2_{RES}$ as follows:

$$MAF1_{RES}=MAF1_{ACT}-MAF1_{EST}; \text{ and}$$

$$MAF2_{RES}=MAF2_{ACT}-MAF2_{EST}.$$

The failure detection module 78 receives the first and second MAF residuals $MAF1_{RES}$ and $MAF2_{RES}$. The failure detection module 78 detects failures of MAF sensor 34 and/or MAF sensor 36 based on the first and second MAF residuals $MAF1_{RES}$ and $MAF2_{RES}$ and one or more thresholds. Specifically, a first MAF residual $MAF1_{RES}$ having an absolute value greater than a threshold indicates a failure of MAF sensor 34. Similarly, a second MAF residual $MAF2_{RES}$ having an absolute value greater than a threshold indicates a failure of MAF sensor 36.

In some implementations, one threshold may be used in detecting failures of both MAF sensor 34 and MAF sensor 36. However, separate thresholds may also be used (e.g., depending on design considerations such as the air flow differences between MAF1 and MAF2). When a failure of MAF sensor 34 is detected, the failure detection module 78 may generate failure signal 80. Similarly, when a failure of MAF sensor 36 is detected, the failure detection module 78 may generate failure signal 82. The failure signals 80 and 82 may be used to set diagnostic flag(s) and/or notify a driver of the vehicle.

Figure 3:
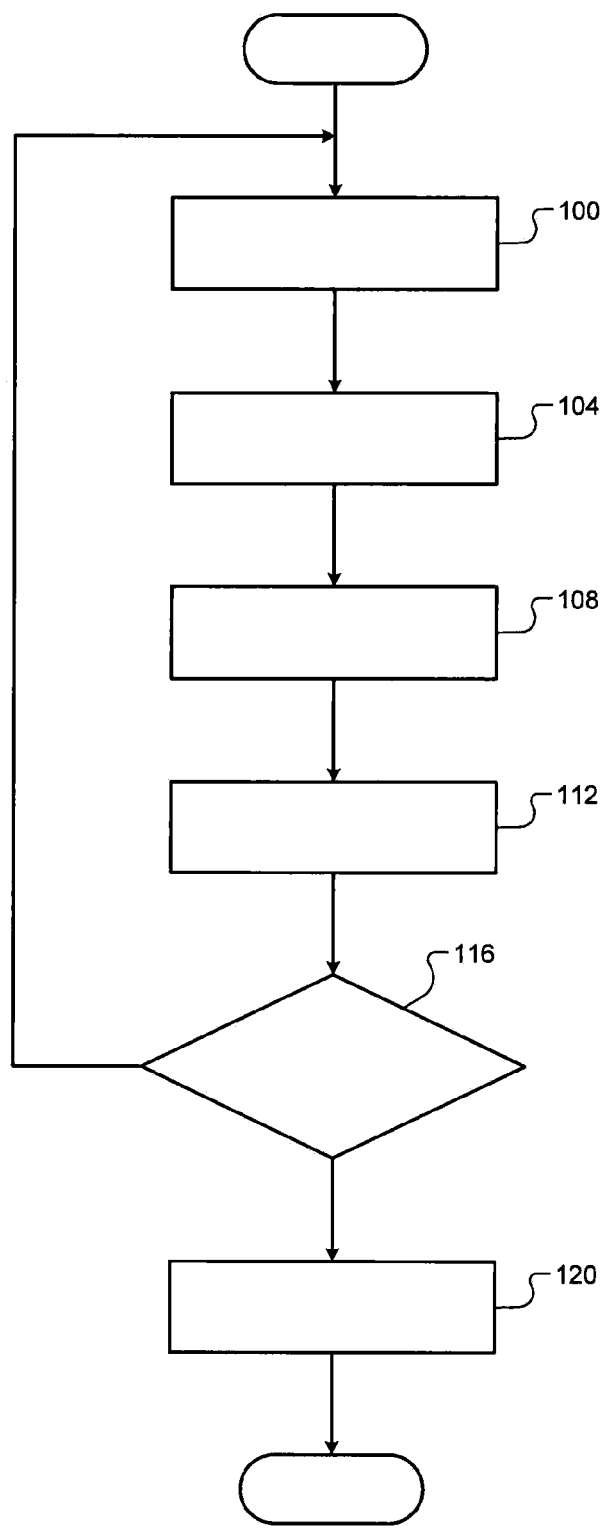
FIG. 3 is a flow diagram illustrating an example method for detecting failures of mass air flow (MAF) sensors in a parallel intake engine according to one implementation of the present disclosure.

Referring now to FIG. 3, an example method for detecting failures of MAF sensors in a parallel intake engine begins at 100. At 100, the control module 60 estimates the total MAF based on the pressure ratio across the throttle 32 and the cross-sectional area of the throttle 32. At 104, the control module 60 generates the factor. At 108, the control module 60 determines the first and second estimated MAFs based on the estimated total MAF and the factor. At 112, the control module 60 calculates the first and second MAF residuals based on the first and second estimated MAFs and measured first and second MAFs from MAF sensors 34 and 36, respectively.

At 116, the control module 60 determines whether the first MAF residual is greater than a corresponding threshold and/or the second MAF residual is greater than a corresponding threshold. If true, control may proceed to 120. If false, control may return to 100. At 120, the control module 60 may generate a failure signal indicating a failure of MAF sensor 34 and/or a failure signal indicating a failure of MAF sensor 36. Control may then end.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for a parallel intake engine, the system comprising:
    a first module that estimates a total mass air flow (MAF) into the engine based on a cross-sectional area of a throttle and a pressure ratio across the throttle;
    a second module that estimates first and second MAFs through first and second induction paths, respectively, based on the estimated total MAF and a factor;
    a third module that calculates first and second differences between the estimated first and second MAFs and first and second MAFs measured by first and second MAF sensors, respectively; and
    a fourth module that detects failures of the first and second MAF sensors based on the first and second differences and first and second thresholds, respectively.

2. The system of claim 1, wherein the factor is based on first and second flow rates through the first and second induction paths, respectively.

3. The system of claim 2, wherein the factor equals the first flow rate divided by a sum of the first flow rate and the second flow rate.

4. The system of claim 1, wherein the second module estimates the first MAF based on a product of the estimated total MAF and the factor.

5. The system of claim 1, wherein the second module estimates the second MAF based on a product of the estimated total MAF and a difference, wherein the difference is a difference between one and the factor.

6. The system of claim 1, wherein the fourth module detects a failure of one of the first and second MAF sensors when the corresponding difference is greater than the corresponding threshold.

7. The system of claim 1, wherein the fourth module detects failures of both the first and second MAF sensors when the first difference is greater than the first threshold and the second difference is greater than the second threshold.

8. The system of claim 1, wherein the fourth module discards measurements by a failed one of the first and second MAF sensors and generates an estimated MAF based on at least one of a corresponding turbocharger turbine speed, a position of the throttle, and exhaust gas oxygen concentration.

9. The system of claim 1, wherein the fourth module generates a failure signal when a failure of one of the first and second MAF sensors is detected, wherein the failure signal at least one of sets a diagnostic flag and notifies a driver of a vehicle.

10. The system of claim 1, wherein the engine further includes two turbochargers implemented in a parallel twin-turbocharger configuration, wherein each of the induction paths includes an intake duct, and wherein the turbochargers pressurize air drawn through the intake ducts, respectively.

11. A method for a parallel intake engine, the method comprising:
estimating a total mass air flow (MAF) into the engine based on a cross-sectional area of a throttle and a pressure ratio across the throttle;
estimating first and second MAFs through first and second induction paths, respectively, based on the estimated total MAF and a factor;
calculating first and second differences between the estimated first and second MAFs and first and second MAFs measured by first and second MAF sensors, respectively; and
detecting failures of the first and second MAF sensors based on the first and second differences and first and second thresholds, respectively.

12. The method of claim 11, wherein the factor is based on first and second flow rates through the first and second induction paths, respectively.

13. The method of claim 12, wherein the factor equals the first flow rate divided by a sum of the first flow rate and the second flow rate.

14. The method of claim 11, further comprising estimating the first MAF based on a product of the estimated total MAF and the factor.

15. The method of claim 11, further comprising estimating the second MAF based on a product of the estimated total MAF and a difference, wherein the difference is a difference between one and the factor.

16. The method of claim 11, further comprising detecting a failure of one of the first and second MAF sensors when the corresponding difference is greater than the corresponding threshold.

17. The method of claim 11, further comprising detecting failures of both the first and second MAF sensors when the first difference is greater than the first threshold and the second difference is greater than the second threshold.

18. The method of claim 11, further comprising discarding measurements by a failed one of the first and second MAF sensors and generates an estimated MAF based on at least one of a corresponding turbocharger turbine speed, a position of the throttle, and exhaust gas oxygen concentration.

19. The method of claim 11, further comprising generating a failure signal when a failure of one of the first and second MAF sensors is detected, wherein the failure signal at least one of sets a diagnostic flag and notifies a driver of a vehicle.

20. The method of claim 11, wherein the engine further includes two turbochargers implemented in a parallel twin-turbocharger configuration, wherein each of the induction paths includes an intake duct, and wherein the turbochargers pressurize air drawn through the intake ducts, respectively.

* * * * *